Patented July 14, 1931

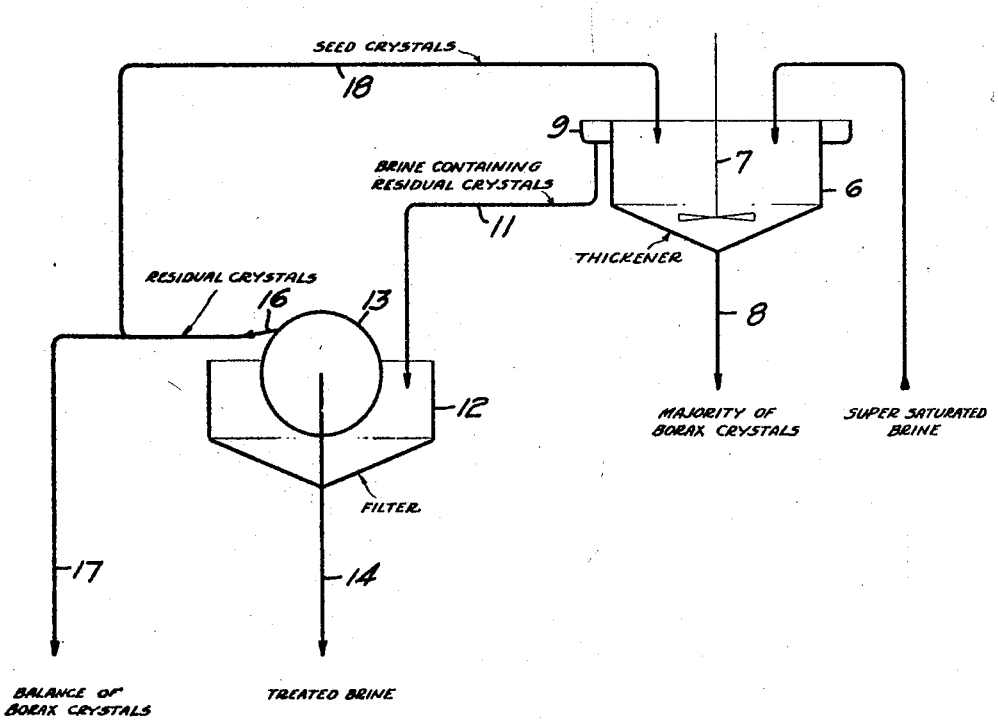

1,814,300

UNITED STATES PATENT OFFICE

LIONEL H. DUSCHAK, OF BERKELEY, CALIFORNIA, ASSIGNOR TO BURNHAM CHEMICAL COMPANY, OF WESTEND, CALIFORNIA, A CORPORATION OF NEVADA

PROCESS OF RECOVERING SUPERSATURANTS

Application filed October 10, 1927. Serial No. 225,375.

My invention relates to the recovery from solutions, particularly brines, of substances with which the solution is supersaturated and is particularly adaptable to the procuring of borax crystals from brine such as that found at Searles Lake, California. Such brines have been variously treated to recover crystallized salts and supersaturants therefrom and in several patents to George B. Burnham there is disclosed a manner of obtaining these substances by the agitation of supersaturated Searles Lake brine. While it is possible to recover a large percentage of the crystals and some of the supersaturant by the employment of such methods, it is not feasible to obtain all of the crystals or substantially all of the supersaturant or supersaturants.

It is therefore an object of my invention to provide a process by which substantially all of the available crystals and supersaturants are obtained from a supersaturated solution.

Another object of my invention is to provide a process of obtaining crystallized and supersaturating borax which can be continuously operated.

A further object of my invention is to provide an ample source of borax crystals to be used as seed in promoting the formation of further borax crystals from a supersaturated brine.

My invention possesses other advantageous features some of which with the foregoing will be set forth at length in the following description where I shall outline in full the preferred form of the process of my invention.

The drawing is a diagrammatic representation of the process of my invention.

In its preferred form, my process preferably comprises treating a supersaturated brine so that crystals are formed therein and removing a large part of such crystals in a preliminary operation, then further treating the brine to remove the balance of the crystals and substantially all of the supersaturant, also preferably utilizing some of the crystals obtained in the further treatment as seed in the initial treatment to accelerate the formation of the initial crop of crystals from the brine.

While my process is by no means confined to the procuring of borax crystals, it is well adapted to such a use and for convenience is so described herein. Brine, such as that obtained at Searles Lake, can be concentrated in a number of different ways until it is supersaturated. As disclosed in the Burnham patents, referred to above, the brine is very often exposed to the action of the sun and wind in open ponds of considerable extent until the brine becomes supersaturated with borax. It is this supersaturated brine that is employed in my process. I first subject the brine to agitation in order to cause or start the formation of crystals of borax from the supersaturated solution.

To this end, supersaturated brine is conducted from the evaporating pond into a thickener 6 of the conventional kind in which is installed an agitator 7. The agitation of the brine initiates the formation of borax crystals. These crystals are continuously gathered to the outlet 8 of the thickener and comprise a large part, usually a majority, of the crystals available in the brine. The deposited crystals discharged from the thickener 6 are available for further treatment, if desired, or usually constitute a commercial product. I, however, desire to obtain from the brine more of the supersaturant than can be separated by the ordinary crystallization and gathering in the thickener. While agitation of brine with seed crystals is effective to relieve supersaturation, the process is not as complete or rapid as is desired. This is apparently because the brine is somewhat viscous and each seed crystal is surrounded with an envelope which must be penetrated before the supersaturant can crystallize and deposit thereon. I therefore treat the brine further, not only to remove almost entirely the crystals already formed, but also to cause the crystallization and recovery of substantially all of the substance supersaturating the brine. For this purpose I provide around the periphery of the thickener an overflow launder 9 of the usual type which receives overflowing brine from which a large part of the borax crystals have been extracted. This brine is conducted from the launder thru a conduit 11 into a filter 12 of any standard kind.

The filter is preferably one comprising a tank to receive the incoming brine in which is installed a rotating drum 13 having a pervious periphery thru which the brine can flow but on which any contained crystals tend to deposit. The drum 13 is slowly rotated during the operation of my process and a suction is exerted on the interior of the drum tending to draw the fluid thru the periphery. The suction can be effected by suitable machinery or the gravital action of the fluid may be employed alone. As the brine from the container 12 passes thru the slowly revolving drum 13, it deposits residual crystals of borax upon the surface of the drum. The treated brine from which substantially all of the available borax crystals have been extracted passes out thru a discharge pipe 14, which, conveniently, can lead back into an evaporating pond for further evaporation to another supersaturation with borax.

During the progress of my process the borax crystals deposit upon the surface of drum 13 in increasing amounts and form a cake or layer of borax crystals. This filter cake of borax crystals is exceedingly valuable in removing a large part of the supersaturant, in this case borax, from the brine passing thru the drum 13. The interstices of minute extent between the deposited crystals not only serve as excellent filters for the interception of additional borax crystals but, apparently due to the scouring action of the brine, the filter cake acts as a seed bed to cause the crystallization and precipitation of substantially all of the supersaturant. There is thus a mechanical filtration or separation of the crystallized borax and also a seeding effect due to the large honey combed cake of borax on which deposit crystals which prior to my invention remained uncrystallized in the supersaturated solution. For these reasons a very large proportion of the total borax available in the brine is extracted and deposited as crystals on the surface of the drum 13. When the process has been in effect for some period and a cake of the desired thickness has built up upon the drum 13, any excess of crystals is preferably removed by a scraper 16 remaining stationary with respect to the drum and bearing against the accumulated cake thereon so that crystals extending radially outward over a given maximum are scraped off and are withdrawn by suitable means 17 to a convenient point of recovery.

I can, of course, employ solely the drum filter to enhance crystallization and remove the borax from the brine but inasmuch as this process is somewhat slower than that of agitation, the crystal recovery is rendered commercially feasible primarily by the process of my invention in which the major portion of the crystals available is first extracted simply by agitation and the residue together with additional crystals is then removed by the drum filter. By the combination of these two methods of producing and removing the borax crystals, I have provided a process which permits substantially all of the borax to be removed from the brine in an economical manner.

Very often the crystallization of borax from the initial brine in the thickener 6 is hastened by the presence of already formed borax crystals which act as seed. As a convenient supply of approximately pure seed crystals I divert, if desired, a portion of the residual crystals obtained from the revolving drum 13 and conduct them, as at 18, back to the thickener 6 into which they are introduced for the purpose of accelerating the formation of borax crystals from the supersaturated brine undergoing agitation therein. In this manner, a certain proportion of the crystals is always undergoing a continuous cycle from the thickener to the drum filter and back to the thickener as seed, while as long as brine is introduced into the thickener I am enabled to take borax crystals thru the outlet 8 and from the discharge 17.

The process of my invention therefore possesses the virtues of the agitation means of removing crystals inasmuch as it is relatively rapid and in addition obtains the advantage of being thorough and extracts substantially all of the available borax from the brine due to the effective filtering thru the revolving filter drum 13. Other apparatus than that described can of course be employed to effect the process of my invention and that shown in the accompanying diagram is purely illustrative as the apparatus can be varied considerably without affecting adversely the results of my process.

I claim:

1. A process of recovering a supersaturant comprising agitating supersaturated brine to promote crystallization, removing crystals from the brine, passing the remaining brine through a filter cake of similar crystals to remove additional crystals from said brine, and using some of said additional crystals as seed in brine being agitated.

2. A process of recovering a supersaturant comprising supersaturated brine, removing a substantial portion of the resulting crystals therefrom, and passing the remaining brine through a cake of similar crystals to remove substantially the remainder of the resulting crystals.

3. A process of removing a supersaturant from brine supersaturated with borax comprising agitating the brine to crystallize out borax, separating a majority of the borax crystals from the brine and passing the remaining brine through a cake of borax crystals.

4. A process of removing a supersaturant from brine supersaturated with borax comprising seeding the brine to promote the formation of borax crystals, removing some of the borax crystals from the brine, passing the remaining brine through a cake of borax crystals to remove others of the borax crystals from said brine, and using crystals from said cake for seeding brine.

5. A process of removing a supersaturant from brine supersaturated with borax comprising agitating the brine in the presence of seed crystals to promote the formation of borax crystals, removing borax crystals from said brine, passing the remaining brine through a filter cake of borax crystals, and using crystals deposited on said cake for seeding brine being treated.

6. A process of removing a supersaturant from brine comprising agitating the brine to form crystals, removing most of said crystals, and passing the remaining brine through a filter cake to promote additional crystallization upon the crystals in said cake.

7. A process of removing a supersaturant from brine comprising treating said brine to form crystals, removing most of said crystals, and passing said brine through a filter cake on which other crystalline matter is formed and deposited.

8. A process of removing supersaturated borax from brine supersaturated with borax comprising agitating the brine in the presence of seed crystals of borax to promote the formation of borax crystals and the growth of said seed crystals, removing borax crystals from said brine, passing the remaining brine through a filter cake of borax crystals, and using the crystals deposited on said cake for seeding brine passing through said filter thereby crystallizing substantially the remaining supersaturated borax from said brine.

9. A process of recovering from a supersaturated brine a supersaturated salt, comprising filtering said supersaturated brine through a filter composed substantially of crystals of said supersaturated salt and removing said crystals from said filter when said filter attains a predetermined size.

10. A process of removing a supersaturant from a supersaturated brine comprising passing said brine through a mass of substantially the crystals of said supersaturant whereby the crystals of said supersaturant are substantially removed, and whereby further crystallization of said supersaturant occurs on said mass of crystals.

In testimony whereof, I hereunto set my hand.

LIONEL H. DUSCHAK.